United States Patent
Yang et al.

(10) Patent No.: US 8,169,959 B2
(45) Date of Patent: *May 1, 2012

(54) SYSTEM AIDED PAPR REDUCTION SCHEME BASED ON TR ALGORITHM

(75) Inventors: Rongzhen Yang, Shanghai (CN); Hujun Yin, San Jose, CA (US); Xiaoliang Luo, Beijing (CN); Liang Jiang, Shanghai (CN); Longjing Zhu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 798 days.

This patent is subject to a terminal disclaimer.

(21) Appl. No.: 12/113,175

(22) Filed: Apr. 30, 2008

(65) Prior Publication Data

US 2009/0274103 A1    Nov. 5, 2009

(51) Int. Cl.
*H04W 4/00* (2009.01)
(52) U.S. Cl. ....................................... 370/329
(58) Field of Classification Search .................... 370/329
See application file for complete search history.

(56) References Cited

U.S. PATENT DOCUMENTS

| | | | | |
|---|---|---|---|---|
| 7,817,733 | B2 * | 10/2010 | Carsello ........................ | 375/260 |
| 2003/0179731 | A1 * | 9/2003 | Noguchi et al. .............. | 370/331 |
| 2007/0116142 | A1 * | 5/2007 | Molander ...................... | 375/260 |
| 2007/0171994 | A1 * | 7/2007 | Parker et al. .................. | 375/260 |
| 2008/0080560 | A1 * | 4/2008 | Inoue et al. ................... | 370/491 |
| 2008/0310484 | A1 * | 12/2008 | Shattil ........................... | 375/146 |
| 2009/0245331 | A1 * | 10/2009 | Palanki et al. ................ | 375/148 |
| 2009/0304097 | A1 * | 12/2009 | Han et al. ...................... | 375/260 |
| 2010/0067615 | A1 * | 3/2010 | Dorpinghaus et al. ........ | 375/295 |
| 2010/0118836 | A1 * | 5/2010 | Kazmi et al. .................. | 370/336 |
| 2010/0177847 | A1 * | 7/2010 | Woodward ..................... | 375/296 |

OTHER PUBLICATIONS

Alard, et al., "Principles of modulation and channel coding for digital broadcasting for mobile receivers", EBU Review, Aug. 1987, pp. 168-190.
Aldinger, M., "Multicarrier COFDM Scheme in High Bitrate Radio Local Area Networks", 5th IEEE International Symp. Personal, Indoor and Mobile Radio Communications, Sep. 1994, pp. 969-973.
Armstrong, J., "Peak-To Average Power Reduction for OFDM by Repeated Clipping and Frequency Domain Filtering", Electronics Letters, Feb. 2002, vol. 38, No. 5, pp. 246-247.
Bauml, et al., "Reducing the Peak-to-Average Power Ratio of Multicarrier Modulation by Selected Mapping", Electronics Letters, Feb. 2002, pp. 1-5.
Bello, P., "Selective Fading Limitations of the Kathryn Modem and Some System Design Considerations", IEEE Transactions on Communication Technology, Sep. 1965, vol. 13, Issue 3, pp. 320-333.
Bingham, John A., "Multicarrier modulation for data transmission: an idea whose time has come", IEEE Communications Magazine, May 1990, vol. 28, pp. 5-8 and 11-14.
Breiling, et al., "SLM Peak-Power Reduction Without Explicit Side Information", IEEE Communications Letters, Jun. 2001, vol. 5, No. 6, pp. 239-241.

(Continued)

*Primary Examiner* — Jeffrey Pwu
*Assistant Examiner* — Saad A Waqas
(74) *Attorney, Agent, or Firm* — Carrie A. Boone, P.C.

(57) ABSTRACT

A peak-to-average power ratio (PAPR) reduction method, known as system-aided PAPR reduction (SAPR), is disclosed. Based on a TR algorithm, the SAPR method avoids the drawbacks of conventional tone reservation implementations, and reduces PAPR significantly, in some embodiments. The SAPR method may be applied to next generation OFDMA-based wireless broadband technologies, to increase system throughput and cell coverage.

15 Claims, 8 Drawing Sheets

OTHER PUBLICATIONS

Chang, Robert W., "Synthesis of Band-Limited Orthogonal Signals for Multichannel Data Transmission", The Bell System Technical Journal, Dec. 1966, pp. 1775-1796.

Chang, et al., "A Theoretical Study of Performance of an Orthogonal Multiplexing Data Transmission Scheme", IEEE Transactions on Communication Technology, Aug. 1968, vol. 16, Issue 4, pp. 529-540.

Chow, et al., "DMT-based ADSL: concept, architecture, and performance", IEE Colloquium on High speed Access Technology and Services, Oct. 1994, pp. 3/1-3/6.

Chong, et al., "A simple encodable/decodable OFDM QPSK code with low peak-to-mean envelope power ratio", IEEE Transactions on Information Theory, Nov. 2001, vol. 47, Issue 7, pp. 3025-3029.

Cimini, Leonard J., "Analysis and Simulation of a Digital Mobile Channel Using Orthogonal Frequency Division Multiplexing", IEEE Transactions on Communications, Jul. 1985, vol. 33, Issue 7, pp. 665-675.

Cimini, et al., "Clustered OFDM with transmitter diversity and coding", GLOBECOM '96. Communications: The Key to Global Prosperity Global Telecommunications Conference, Nov. 1996, vol. 1, pp. 703-707.

Cimini, et al., "OFDM with diversity and coding for advanced cellular Internet services", IEEE Global Telecommunications Conference, 1997, Nov. 1997, vol. 1, pp. 305-309.

Davis, et al., "Peak to mean power control and error correction for OFDM transmission using Golay sequences and Reed-Muller codes", Electronic Letter, Feb. 1997, pp. 267-268.

Davis, et al., "Peak-to-mean power control in OFDM, Golay complementary sequences and Reed-Muller codes", IEEE Transactions on Information Theory, Nov. 1999, vol. 45, No. 7, pp. 2397-2417.

Dinis, et al., "Performance trade-offs with quasi-linearly amplified OFDM through a two-branch combining technique", Mobile Technology for the Human Race, IEEE 46th Vehicular Technology Conference, 1996, vol. 2, pp. 899-903.

Doelz, et al., "Binary Data Transmission Techniques for Linear Systems", Proceedings of the IRE, May 1957, vol. 45, Issue 5, pp. 656-661.

Li, et al. "Effects of clipping and filtering on the performance of OFDM", IEEE Communications Letters, May 1998, vol. 2, No. 5, pp. 131-133.

Ffernandez-Getino Garcia, et al., "Orthogonal pilot sequences for peak-to-average power reduction in OFDM", VTC 2001 Fall. IEEE VTS 54th Vehicular Technology Conference, 2001, vol. 2, pp. 650-654.

Friese, M., "Multicarrier modulation with low peak-to-average power ratio", Electronics Letters, Apr. 1996, vol. 32, Issue: 8, pp. 713-714.

Golay, M., "Complementary series", IRE Transactions on Information Theory, Apr. 1961, vol. 7, Issue: 2, pp. 82-87.

Grant, et al., "Efficient Maximum-Likelihood Decoding of Q-ary Modulated Reed-Muller Codes", IEEE Communications Letters, May 1998, vol. 2, No. 5, pp. 134-136.

Han, et al., "PAPR Reduction of OFDM Signals Using a Reduced Complexity PTS Technique", IEEE Signal Processing Letters, Nov. 2004, vol. 11, No. 11, pp. 887-890.

Hill, et al., "Reducing the peak-to-average power ratio in OFDM by cyclically shifting partial transmit sequences", Electronics Letters, Mar. 2000, vol. 36, Issue 6, pp. 560-561.

Ho, et al., "Synthesis of low-crest waveforms for multicarrier CDMA system", IEEE Global Telecommunications Conference, 1995, Nov. 1995, pp. 131-135.

Jayalath, et al., "Adaptive PTS approach for reduction of peak-to-average power ratio of OFDM signal", Electronics Letters, Jul. 6th, 2000, vol. 36, No. 14, pp. 1226-1228.

Jedwab, Jonathan, "Comment: 'M-Sequences for OFDM Peak-to-Average Power Ratio Reduction and Error Correction'", Electric Letter, Jul. 1997, vol. 33, No. 15, pp. 1293-1294.

Jones, et al., "Block coding scheme for reduction of peak to mean envelope power ratio of multicarrier transmission schemes", Electronics Letters, Dec. 1994, vol. 30, Issue 25, pp. 2098-2099.

Jones, et al., "Combined coding for error control and increased robustness to system non-linearities in OFDM", IEEE 46th Vehicular Technology Conference, 1996, vol. 2, pp. 904-908.

Krongold, et al., "An Active-Set Approach for OFDM PAR Reduction Via Tone Reservation", IEEE Transactions on Signal Processing, Feb. 2004, vol. 52, No. 2, pp. 495-509.

Krongold, et al., "PAR Reduction in OFDM via Active Constellation Extension", IEEE Transactions on Broadcasting, Sep. 2003, vol. 49, No. 3, pp. 258-268.

Muller, "A novel peak power reduction scheme for OFDM", Proc. of the Int. Symposium on Personal, Indoor and Mobile Radio Communications PIMRC '97, Sep. 1997, 5 pages.

Muller, et al., "OFDM with Reduced Peak-to-Average Power Ratio by Optimum Combination of Partial Transmit Sequences", Electronic Letter, Feb. 1997, vol. 33, Issue. 5, pp. 368-369.

Muller, et al., "OFDM with Reduced Peak-to-Average Power Ratio by Multiple Signal Representation", In Annals of Telecommunications, Feb. 1997, pp. 1-9.

van Nee, R. D. J., "OFDM codes for peak-to-average power reduction and error correction", 'Communications: The Key to Global Prosperity Global Telecommunications Conference, Nov. 1996, vol. 1, pp. 740-744.

van Nee, et al., "OFDM for wireless multimedia communications", Artech house, 2000, pp. 279.

Tarokh, et al., "On the computation and reduction of the peak-to-average power ratio in multicarrier communications", IEEE Transactions on Communications, Jan. 2000, vol. 48, Issue: 1, pp. 37-44.

Ochiai, et al., "On the distribution of the peak-to-average power ratio in OFDM signals", IEEE Transactions on Communications, Feb. 2001, vol. 49, Issue: 2, pp. 282-289.

O'Neill, et al., "Envelope variations and spectral splatter in clipped multicarrier signals", IEEE International Symposium on Personal, Indoor and Mobile Radio Communications, 1995, Sep. 1995, vol. 1, pp. 71-75.

Paterson, Kenneth, "Generalised Reed-Muller Codes and Power Control in OFDM Modulation", Aug. 16-21, 1998, p. 194.

Paterson, et al., "On the Existence and Construction of Good Codes with Low Peak-to-Average Power Ratios", 2000, pp. 1-22.

Paterson, et al., "Efficient Decoding Algorithms for Generalised Reed-Muller Codes", IEEE Transactions on Communications, Aug. 2000, vol. 48, No. 8, pp. 1272-1285.

Piret, Philippe, "Bounds for codes over the unit circle", IEEE Transactions on Information Theory, Nov. 1986, vol. 32, Issue: 6, pp. 760-767.

Porter, Gene C., "Error Distribution and Diversity Performance of a Frequency-Differential PSK HF Modem", IEEE Transactions on Communication Technology, Aug. 1968, vol. 16, Issue:4, pp. 567-575.

Saltzberg, B., "Performance of an Efficient Parallel Data Transmission System", IEEE Transactions on Communication Technology, Dec. 1967, vol. 15, Issue: 6, pp. 805-811.

Salz, et al., "Fourier transform communication system", Proceedings of the first ACM symposium on Problems in the optimization of data communications systems, 1969, 5 pages.

Sharif, et al., "On the Peak-to-Average Power of OFDM Signals Based on Oversampling", IEEE Transactions on Communications, Jan. 2003, vol. 51, No. 1, pp. 72-78.

Shepherd, et al., "Asymptotic limits in peak envelope power reduction by redundant coding in orthogonal frequency division multiplex modulation", IEEE Transactions on Communications, Jan. 1998, vol. 46, Issue: 1, pp. 5-10.

Cho, et al., "Essentials of Wireless", WiMAX Technical Marketing, Intel WiMAX Program Office China Training, Apr. 24th, 2007, pp. 1-68.

Tellambura, C., "Improved phase factor computation for the PAR reduction of an OFDM signal using PTS", IEEE Communications Letters, Apr. 2001, vol. 5, Issue 4, pp. 135-137.

Luo, et al., "Tone Reservation technique for PAPR reduction", May 2007, 32 pages.

Van Eetvelt, et al., "Peak to average power reduction for OFDM schemes by selective scrambling", Electronics Letters, Oct. 1996, vol. 32, Issue: 21, pp. 1963-1964.

Wei, et al., "A Modern Extreme Value Theory Approach to Calculating the Distribution of the Peak-to-Average Power Ratio in OFDM Systems", Proc. IEEE ICC, 2002, pp. 1686-1690.

Wilkinson, et al., "Minimisation of the peak to mean envelope power ratio of multicarrier transmission schemes by block coding", IEEE 45th Vehicular Technology Conference, Jul. 1995, vol. 2, pp. 825-829.

Yin, et al., "PAPR reduction techniques for OFDM system", Apr. 2007, 52 pages.

Wulich, D., "Reduction of peak to mean ratio of multicarrier modulation using cyclic coding", Electronic Letters, Feb. 29, 1996, vol. 32, Issue 5, pp. 432-433.

Wunder, et al., "Upper bounds on the statistical distribution of the crest-factor in OFDM transmission", IEEE Transactions on Information Theory, Feb. 2003, vol. 49, Issue: 2, pp. 488-494.

Zimmerman, et al., "The AN/GSC-10 (KATHRYN) Variable Rate Data Modem for HF Radio", IEEE Transactions on Communication Technology, Apr. 1967, vol. 15, Issue: 2, pp. 197-204.

Weinstein, et al., "Data Transmission by Frequency-Division Multiplexing Using the Discrete Fourier Transform", IEEE Transactions on Communication Technology, Oct. 1971, vol. 19, Issue: 5, pp. 628-634.

Cimini, et al., "Peak-to-average power ratio reduction of an OFDM signal using partial transmit sequences", IEEE Communications Letters, Mar. 2000, vol. 4, Issue: 3, pp. 86-88.

Li, et al., "M-sequences for OFDM peak-to-average power ratio reduction and error correction", Electronics Letters, Mar. 1997, vol. 33, Issue: 7, pp. 554-555.

Salter, Avril, "WiMAX Training", WiMAX World, May 29-31, 2007, pp. 1-55.

* cited by examiner

SYSTEM AIDED PAPR REDUCTION SCHEME BASED ON TR ALGORITHM

TECHNICAL FIELD

This application relates to peak-to-average power ratio in wireless devices and, more particularly, to methods for reducing the ratio.

BACKGROUND

Orthogonal frequency division multiple access (OFDMA) modulation is well known to have a high peak-to-average power ratio (PAPR). A high PAPR reduces the power efficiency of a transmitter power amplifier (PA) and increases PA back-off, the latter of which reduces the uplink link budget. Therefore, it is desirable to control the PAPR for uplink transmission.

The PAPR reduction for OFDMA modulation has been studied extensively, with several possible solutions emerging. Tone reservation (TR) is one of the promising techniques. With TR, the system reserves a set of sub-carriers, or tones, for PAPR reduction. The reserved tones are not used for data transmission. Instead, when one signal has high PAPR, a compensating sequence is transmitted, using the reserved tones, to reduce the PAPR of the signal.

However, the conventional TR approaches have some drawbacks. The reserved tones may not be used for data transmission, which increases the system overhead. Further, there exist only a limited and fixed number of available reserved tones. These concerns limit the potential PAPR reduction benefit using the TR technique.

WiMAX (i.e., the Worldwide interoperability for Microwave Access), as currently defined by IEEE (Institute of Electrical and Electronics Engineers) 802.16-series specification, uses OFDMA in the uplink due to its generally outstanding properties and in order to simplify the overall standard by maintaining similarity with the downlink signal. In contrast, the long-term evolution (LTE) effort in the third generation partnership project, known as 3GPP, is contemplating the use of SC-FDMA (Single Carrier-Frequency Division Multiple Access) in the uplink while maintaining a choice of OFDMA for the downlink. The justification for choosing SC-FDMA over OFDMA in the LTE uplink is due to the PAPR issue.

Thus, there is a continuing need for an uplink transmission scheme that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel peak-to-average power ratio (PAPR) reduction method, known as system-aided PAPR reduction (SAPR), is disclosed. Based on a TR algorithm, the SAPR method avoids the drawbacks of conventional tone reservation implementations, and reduces PAPR significantly, in some embodiments. The SAPR method may be applied to next generation OFDMA-based wireless broadband technologies, such as 802.16e, 802.16m (the WiMax II air interface), 3GPP ((third generation partnership project) LTE (long term evolution), 3GPP UMB (ultra mobile broadband), etc., to increase system throughput and cell coverage.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
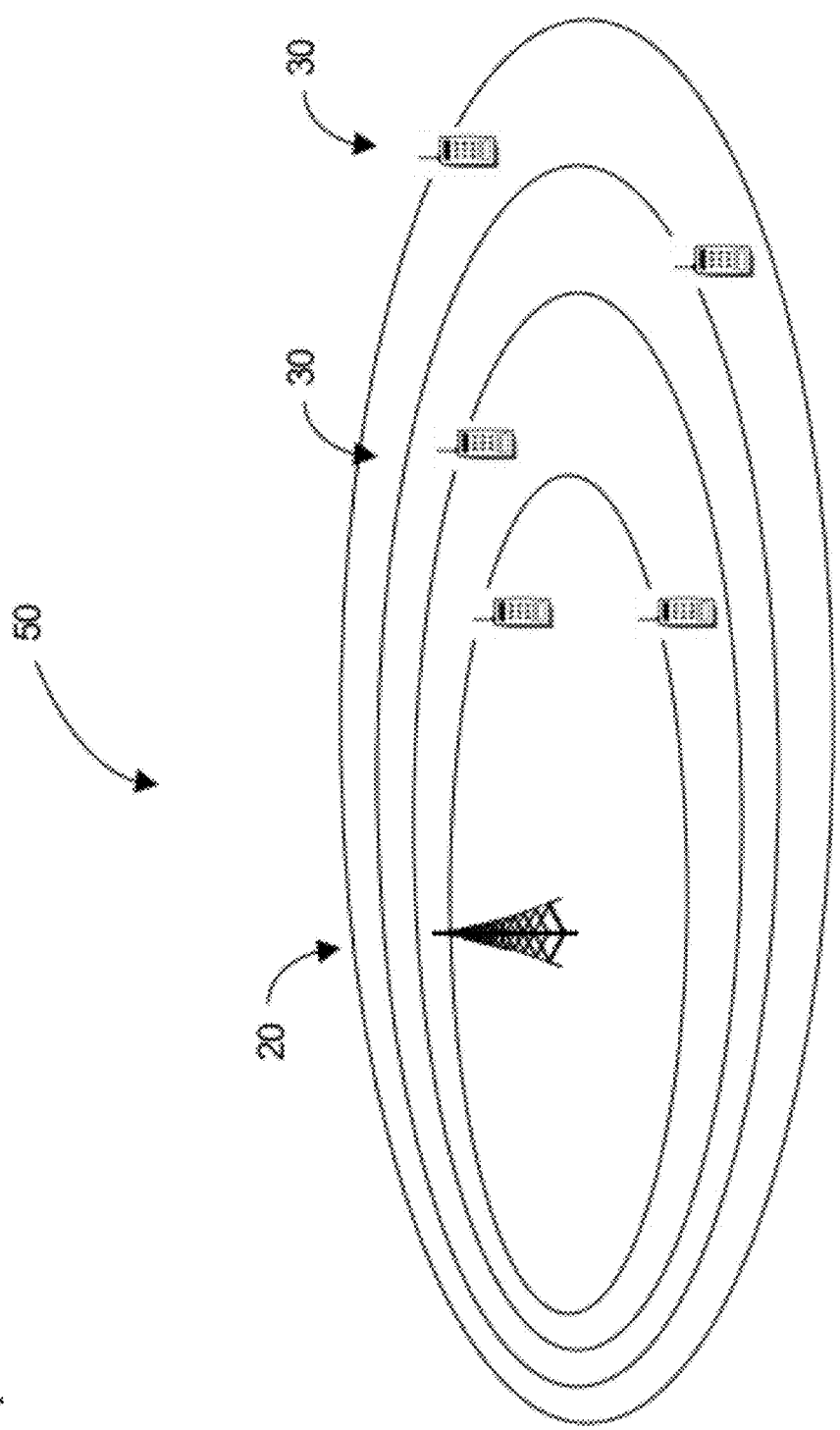
FIG. 1 is a schematic diagram of an OFDMA wireless communication neighborhood, according to some embodiments.

FIG. 1 is a schematic diagram of an OFDMA wireless communication neighborhood 50, including a base station 20 and multiple subscriber (mobile) stations 30. The signal strength received by the base station 20 from the various subscriber stations 30 varies greatly, depending on the distance to the base station (path loss), propagation scenarios, fading, etc., of each subscriber station 30.

The subscriber stations 30 that have a low uplink (UL) signal strength received at the base station 20 are likely to need PAPR reduction, relative to the stations 30 having a strong UL signal strength. (The uplink signal is one sent from the subscriber station 30 to the base station 20.) Such low UL signal strength subscriber stations 30 are more likely to desire a PAPR reduction, resulting in an increase in UL signal strength to the base station 20. Thus, in any given wireless neighborhood 50, some of the subscriber stations 30 may benefit from PAPR reduction, while other subscriber stations may not need PAPR reduction. Further, the needs of each subscriber station 30 in this respect may change over time.

Figure 2:
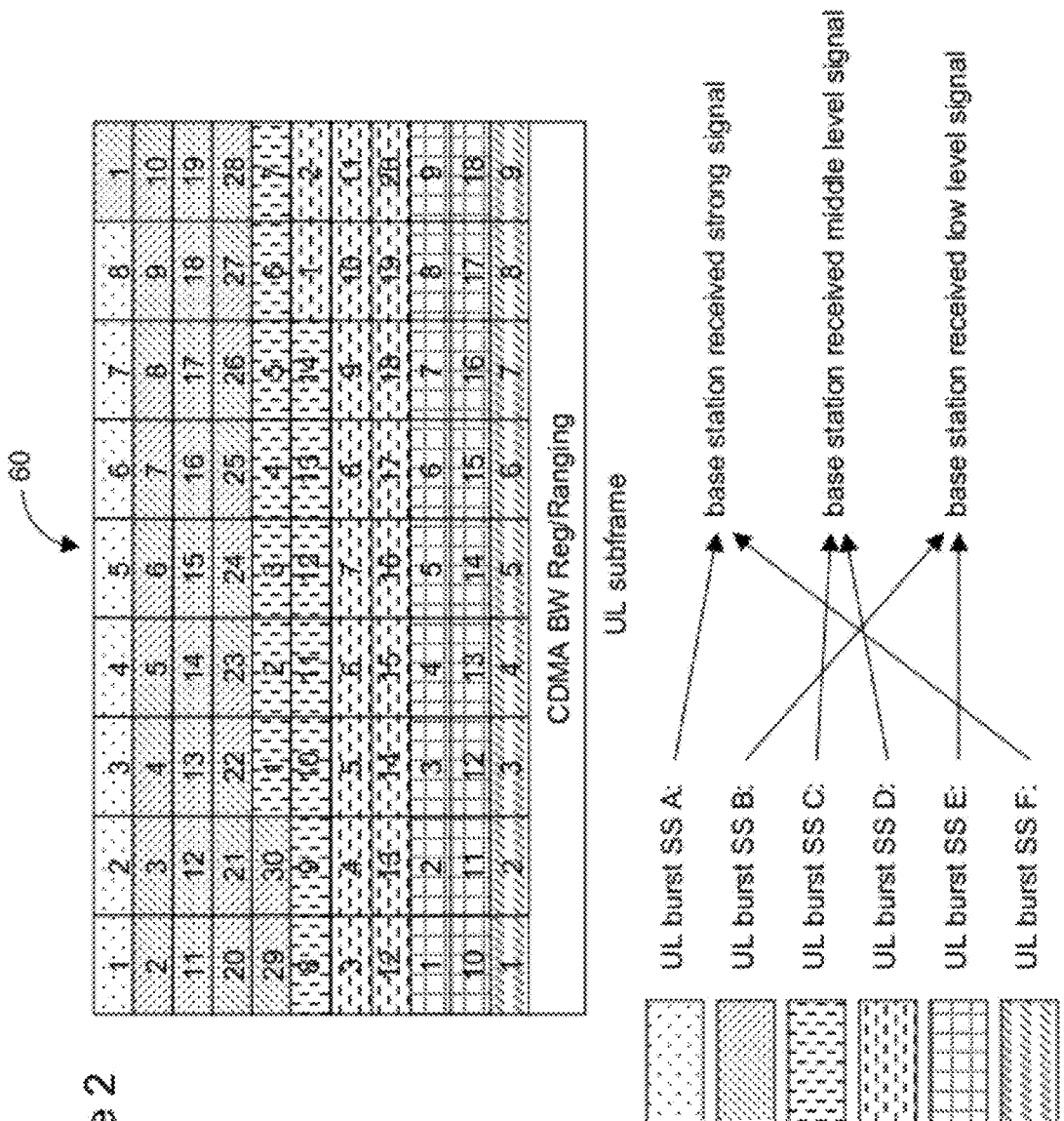
FIG. 2 is a table showing uplink bursts for six subscriber stations, according to some embodiments.

FIG. 2 is a diagram of a table 60 of uplink information for six hypothetical users, or subscriber stations 30, according to some embodiments, for a WiMAX uplink system. In the table 60, six users A, B, C, D, E, and F, are assumed to be assigned to one uplink frame with six uplink bursts, respectively. Each UL burst in the table 60 is uniquely indicated, as shown, with the UL burst A occupying the first eight bytes, the UL burst B occupying the next thirty bytes, and so on. Strong uplink signals are received by the base station from users A and F, middle level signals are received by the base station from users C and D, and weak uplink signals are received by the base station from users B and E. Accordingly, subscriber stations B and E would benefit from an improved link budget and an increased signal strength transmitted to the base station 20.

Figure 3:
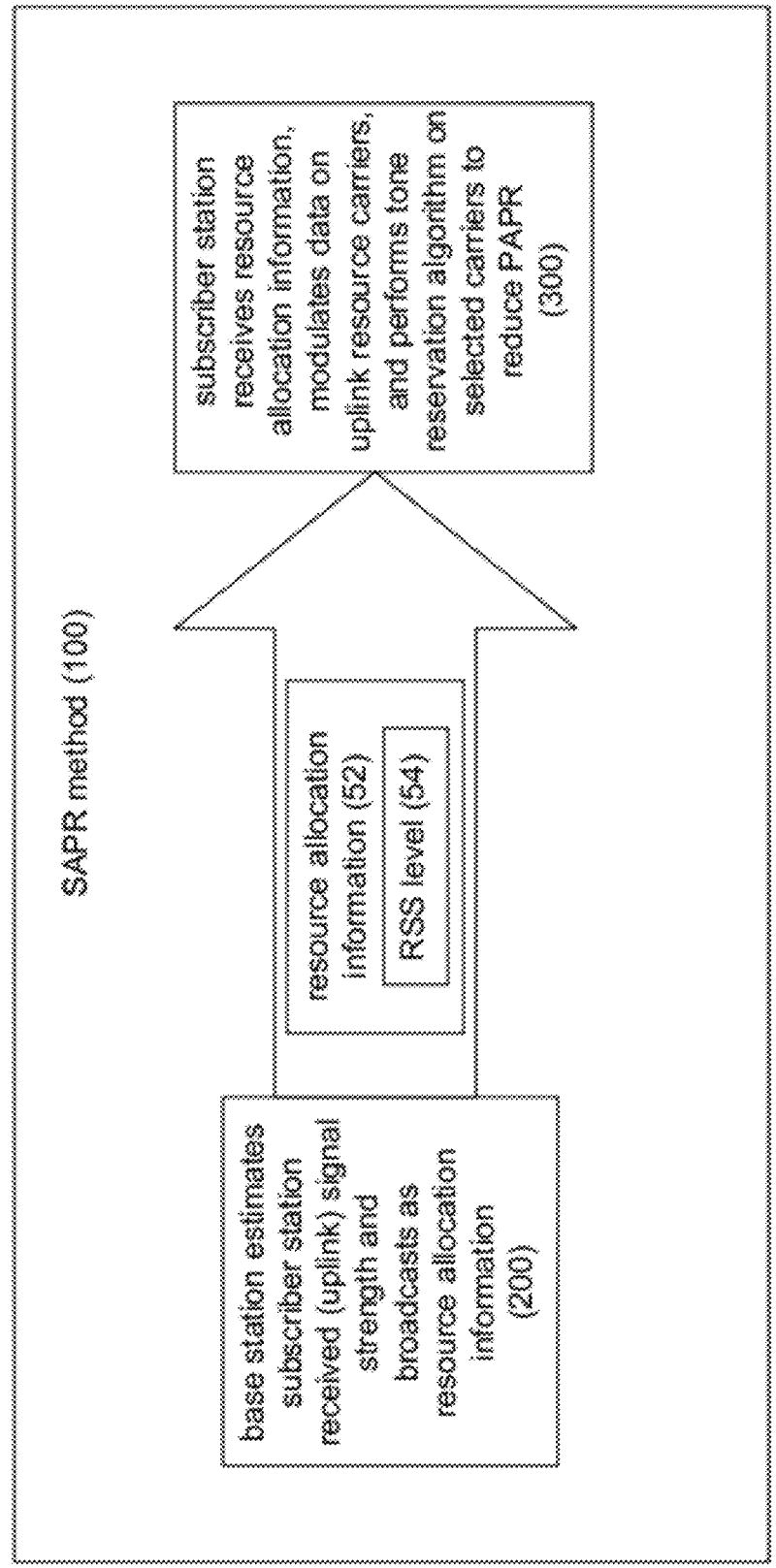
FIG. 3 is a schematic block diagram of an SAPR algorithm, according to some embodiments.

FIG. 3 is a simplified block diagram of a novel system-aided PAPR (SAPR) reduction method 100, according to some embodiments. The SAPR method 100 involves coordination between the base station 20 and subscriber station(s) 30 in the wireless neighborhood 50 needing PAPR reduction. Accordingly, the SAPR method 100 includes base station operations 200, in which the base station 20 embeds received signal strength (RSS) information 54 in the resource allocation information 52 that is sent to the subscriber station 30, and subscriber station operations 300. The base station and subscriber station operations are described further in the flow diagrams of FIGS. 5 and 6, respectively, below.

The SAPR method 100 may be employed for subscriber stations 30 with strong uplink (UL) signal strength received by the base station 20. The uplink carriers of such subscriber stations 30 may potentially be used as the reserved tones for the TR algorithm employed by the SAPR method 100, to reduce PAPR for the subscriber stations 30 with low UL signal strength received by the base station 20. Thus, for example, in the illustration of FIG. 2, the SAPR method 100 may use the uplink carriers of user A as the reserved tones for executing the TR algorithm on user B. Since the base station 20 received a strong signal from user A, user A doesn't need its reserved tones. The SAPR method 100 exploits this situation by using the user A reserved tones to accommodate user B.

Figure 4:
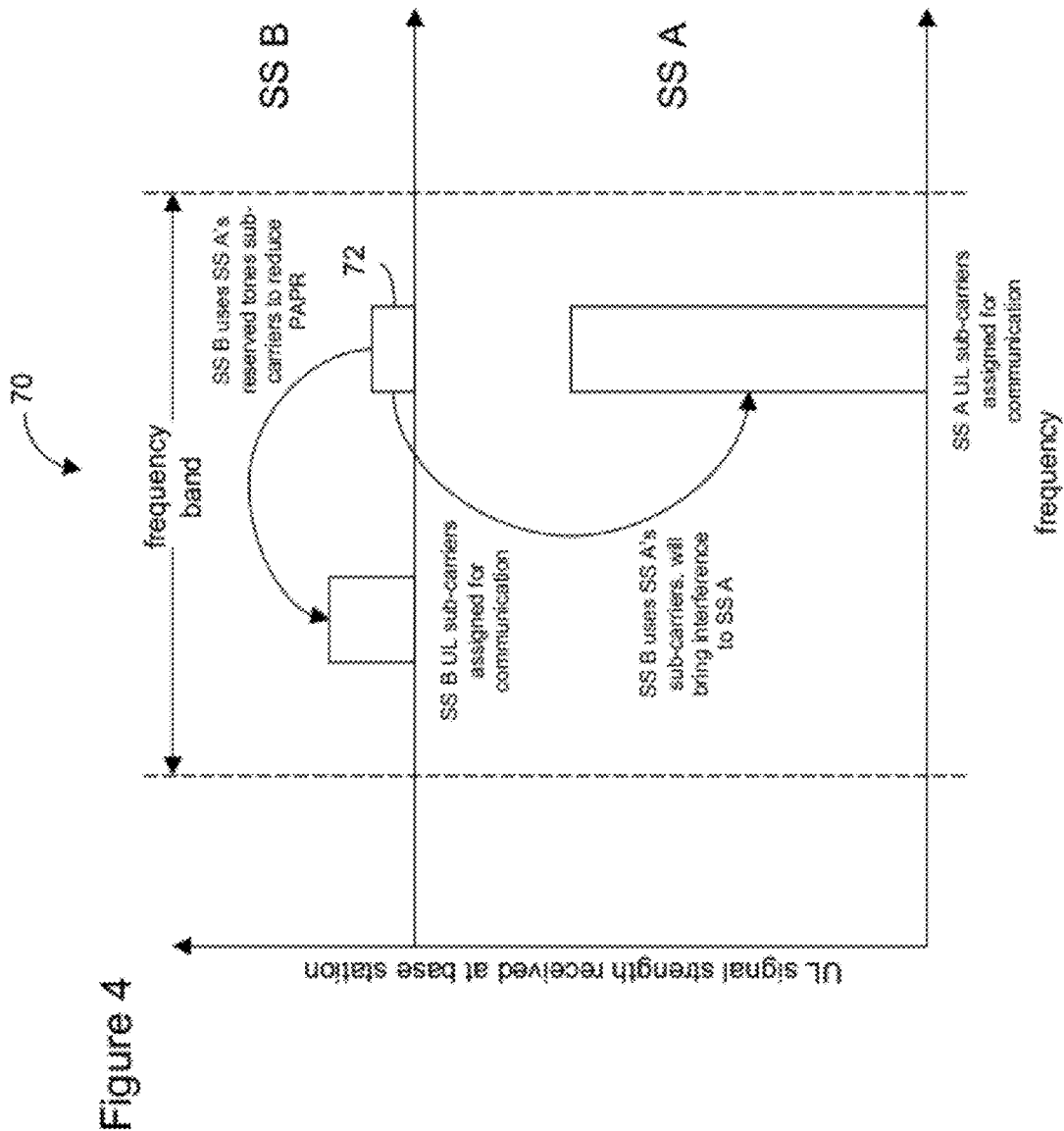
FIG. 4 is a graph illustrating how an SAPR algorithm uses sub-carriers with strong uplink signals to benefit subscriber stations with weak uplink signals, according to some embodiments.

FIG. 4 illustrates how the SAPR method 100 operates, according to some embodiments. The graph 70 plots frequency versus uplink signal strength received at the base station 20, with stronger signals being indicated at the bottom of the graph, weaker ones at the top. Subscriber station B is assigned a lower frequency while subscriber station A is allocated a slightly higher frequency. Reserved tones 72 of subscriber station A are reassigned to subscriber station B, as illustrated, since subscriber station A has strong signals received at the base station already. Using the SAPR method 100, the subscriber station B uses the sub-carriers assigned to subscriber station A to reduce the PAPR of subscriber station B, in some embodiments.

In some embodiments, the interference introduced by the SAPR method 100 is quite small, and is controlled by base station scheduling. In some embodiments, the SAPR method 100 may be used by all tone reservation algorithms, without the requirement that tones be reserved.

As discussed above, the conventional tone reservation approaches have some drawbacks. For one, the reserved tones may not be used for data transmission, which increases the system overhead. For another, conventional tone reservation algorithms use a limited and fixed reserved number of tones, limiting the effectiveness of the PAPR reduction. In some embodiments, the SAPR method 100 fully solves these drawbacks by using available reserved tones from other subscriber stations to reduce the PAPR of stations having weak uplink signals.

Figure 5:
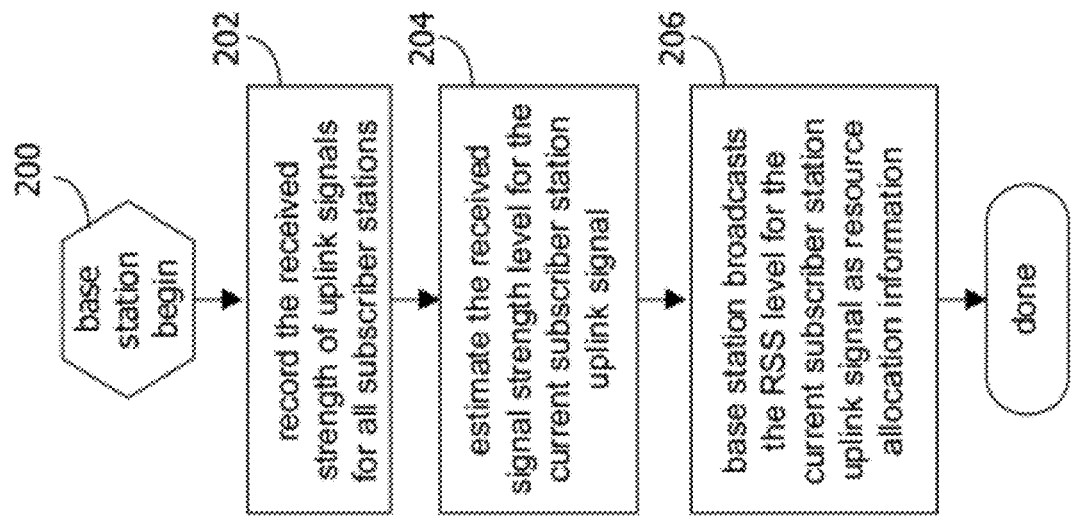
FIG. 5 is a flow diagram showing operation of the base station in performing the SAPR algorithm of FIG. 3, according to some embodiments.
Figure 6:
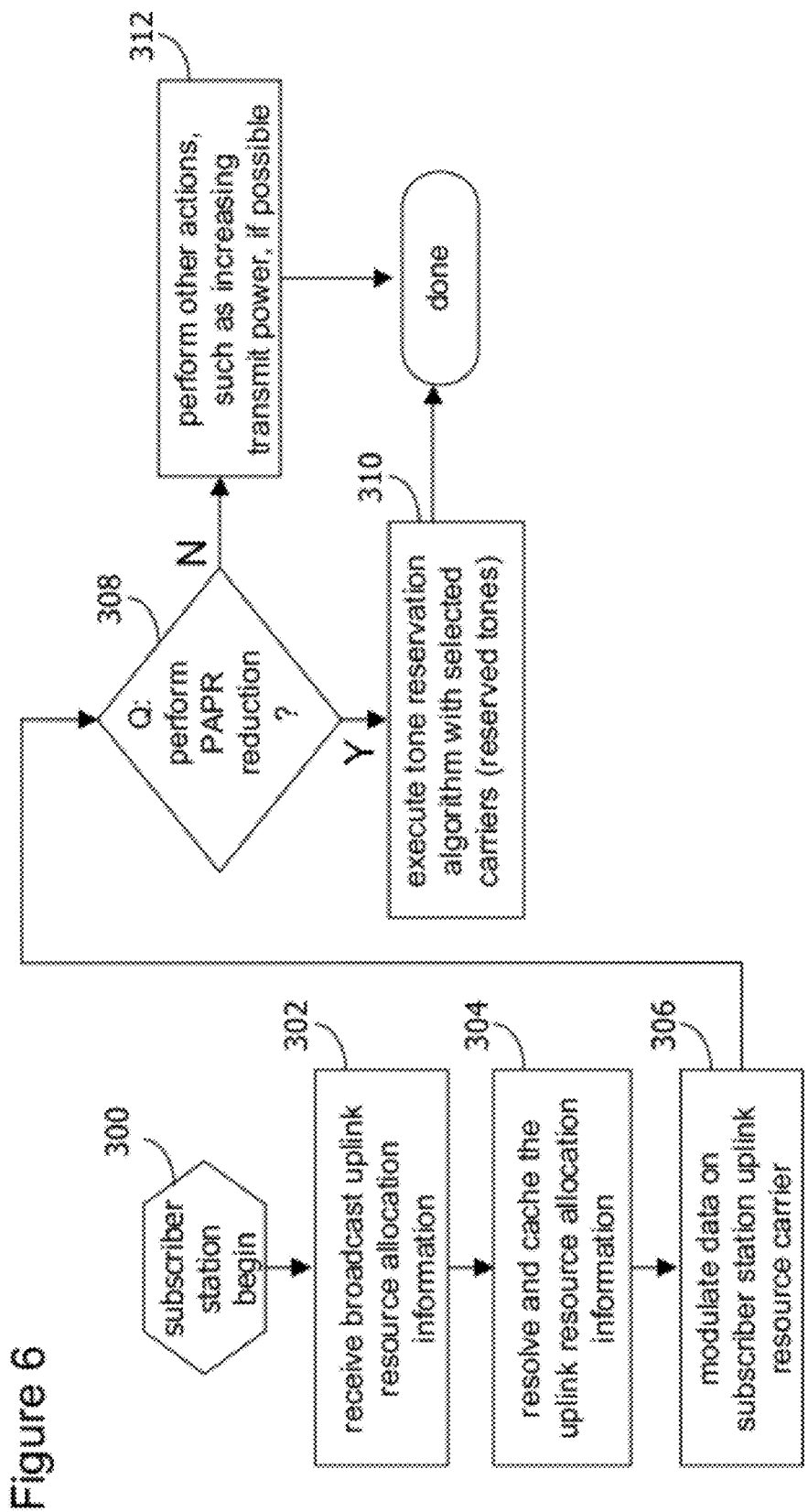
FIG. 6 is a flow diagram showing operation of the subscriber station in performing the SAPR algorithm of FIG. 3, according to some embodiments.

FIG. 5 is a flow diagram 200 showing operation of the base station 20 in using the SAPR method 100, according to some embodiments. Referring also to the wireless neighborhood 50 (FIG. 1), the base station 20 performs these operations in conjunction with operations performed by the subscriber station(s) 30, as illustrated in FIG. 6, below. The base station 20 first continually records the received signal strength (RSS) of all uplink signals, such as in a memory buffer, so that the data may subsequently be used (block 202). According to the historic record of received uplink signal strength (RSS) for each subscriber station 30 in the wireless neighborhood 50, the base station 20 gives an estimation (or judgment) of the uplink signal strength of the current wireless station 30 that will arrive at the base station (block 204). In some embodiments, the uplink signal strength is expressed as signal level information.

By using the historic RSS records for all uplink signals in the memory buffer, the base station 20 is able to estimate the RSS level that will be expressed. Then, for all subscriber stations 30 that will be assigned an uplink resource for uplink communication in the current frame, the base station 20 broadcasts their uplink RSS signal level information in the downlink signal channels (block 206). In some embodiments, the RSS level information is embedded within the resource allocation information broadcast in the downlink. Thus concludes the operations of the base station 20 in the SAPR method 100.

FIG. 6 is a flow diagram showing the operations of the subscriber station 30 in performing the SAPR method 100, according to some embodiments. First, the subscriber station 30 receives the uplink resource allocation information 52 from the base station 20 (block 302). The resource allocation 52 points out the current frequency-time resource assigned to each subscriber station 30, as well as the uplink RSS level 54 at the base station 20 for each subscriber station. According to the information received, the subscriber station 30 resolves the information (e.g., figures out which stations are transmitting strong signals and which ones are not), and caches the information (block 304). Also, the subscriber station 30 generates a raw uplink signal with uplink data at its assigned time-frequency OFDMA symbol (block 306).

In executing the SAPR method 100, the subscriber station 30 next evaluates whether PAPR reduction of the generated OFDMA symbol should be performed, based on the current operating conditions of the subscriber station 30, to increase the uplink power (block 308). The current operating conditions include the condition of the current power amplifier (PA) back-off value, the PA attributes, the current transmit power, etc. Where the decision is made not to perform PAPR reduction, other possible actions may be taken, such as increasing the transmit power (block 312). Where PAPR reduction is to be performed, the subscriber station 30 selects one of several possible TR algorithms. The subscriber station 30 also uses carriers that are assigned to other subscriber stations 30, such as the carrier 72 (FIG. 4), to reduce the PAPR (block 310). In this manner, the subscriber station 30 having the weak uplink signal is able to "borrow" the reserved tones from a neighboring subscriber station having a stronger uplink signal, as the RSS level 54 of the neighboring subscriber station is supplied by the base station 20 as part of its resource allocation information 52. In this process, the interference to other subscriber stations 30 may be considered and controlled, to not affect the throughput of those stations.

Figure 7:
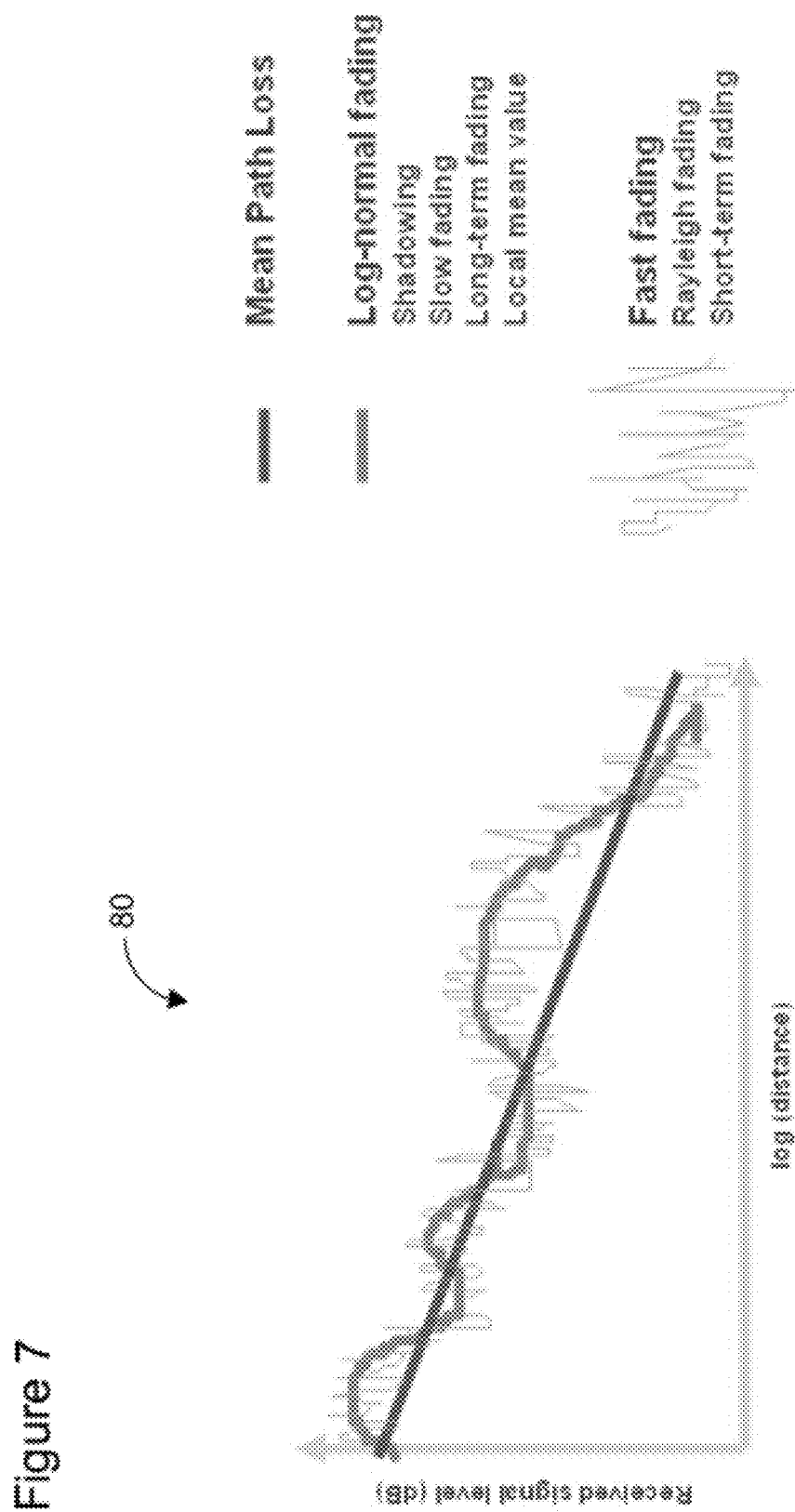
FIG. 7 is a graph showing a typical received signal distribution in a cell, according to some embodiments.

FIG. 7 is a graph 80 showing a typical received signal distribution in one cell, according to some embodiments. Two parameters are defined as follows. A first parameter, SS_UL_signal_level, is defined as the base station 20 estimate of the subscriber station 30 uplink signal level for the current frame, to express the combined effects of mean path loss and log-normal fading. With a second parameter, fast_fading_range, the base station 20 estimates the fast fluctuating range of a signal due to fast fading at a predefined possibility (such as 95%).

Figure 8:
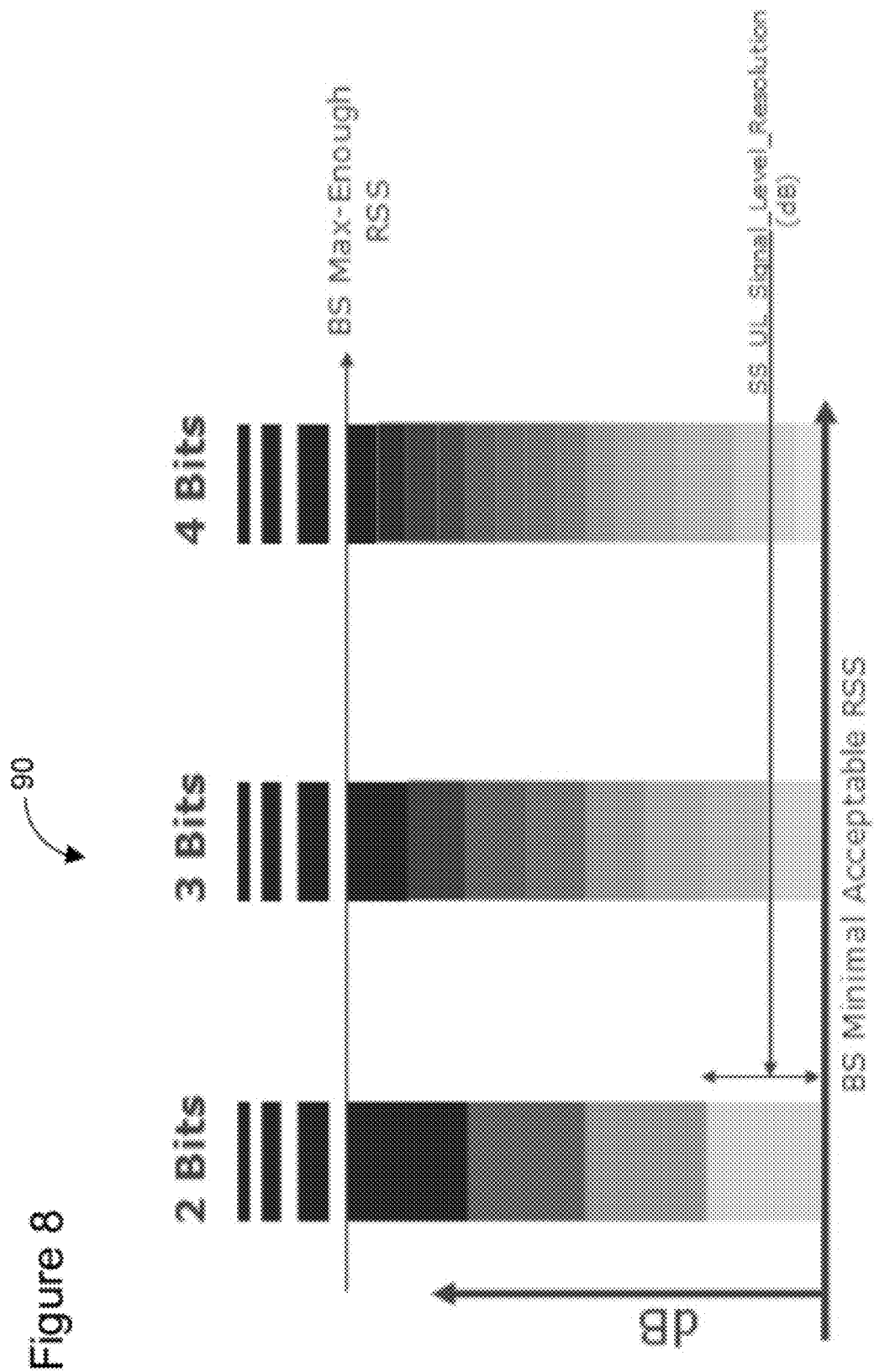
FIG. 8 is a graph showing examples using an n of two bits, three bits, and four bits, according to some embodiments.

The first parameter, SS_UL_signal_level, is broadcast by the base station 20 and is associated with the uplink resource allocation information 52 in the downlink signaling channel, by using n bits. FIG. 8 is a graph 80 showing a typical signal fading distribution, using an n of 2 bits, 3 bits, and 4 bits. The parameter, SS_UL_signal_level, is broadcast and associated with uplink resource allocation information 52 (take WiMAX as an example).

In some embodiments, the SAPR method 100 uses other parameters as well. A safe_interference_level parameter is used when a power-limited mobile station uses the SAPR method 100 by using the sub-carriers of other subscriber stations 30, since interference is generated. The safe_interference_level parameter points out the maximum allowed interference, in some embodiments.

A SS_UL_signal_level_resolution parameter (shown in FIG. 8) points out the range of one SS_UL_signal level. The parameters, safe_interference_level, SS_UL_signal_level_resolution, and fast_fading_range, are broadcast by the base station 20 periodically, as part of the resource allocation information 52, in some embodiments.

Thus, the SAPR method 100 presents a novel PAPR reduction implementation, which may be used to improve the performance of wireless communication system based on OFDM technology. The SAPR method 100 may improve system performance. Wireless broadband product manufacturers, at the base station, the mobile device (subscriber station), or on silicon, may benefit by using the SAPR method 100.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method, comprising:
   recording, by a base station, uplink signals received from a plurality of subscriber stations in a wireless neighborhood, wherein each of the plurality of subscriber stations is assigned one or more reserved carriers;
   estimating, by the base station, a received signal strength level for a subscriber station of the plurality of subscriber stations;
   broadcasting, by the base station, the received signal strength level as resource allocation information to the plurality of subscriber stations; and
   receiving, by the base station, an uplink signal from the subscriber station, wherein the uplink signal:
     has an updated received signal strength that is higher than the received signal strength estimated by the base station; and
     is transmitted using one or more reserved carriers originally assigned to a second subscriber station of the plurality of subscriber stations, the second subscriber station comprising a second received signal strength, wherein the received signal strength is lower than the second received signal strength.

2. The method of claim 1, further comprising:
   storing, by the base station, the received signal strength in a memory buffer.

3. The method of claim 2, further comprising:
   estimating, by the base station, the received signal strength for the subscriber station based on a historical record of received uplink signal strength for each of the plurality of subscriber stations.

4. The method of claim 3, estimating, by the base station, the received signal strength for the subscriber station further comprising:
   expressing, by the base station, the received signal strength as signal level information.

5. A method, comprising:
   receiving, by a first subscriber station of a plurality of subscriber stations in a wireless neighborhood, resource allocation information from a base station in the wireless neighborhood, wherein the resource allocation information comprises received signal strength levels from the plurality of subscriber stations and each of the plurality of subscriber stations is assigned one or more reserved carriers;
   determining, by the first subscriber station based on the resource allocation information, that a second subscriber station of the plurality of subscriber stations is transmitting stronger signals to the base station than signals transmitted by the first subscriber station to the base station; and
   using, by the first subscriber station, one or more reserved carriers assigned by the base station to the second subscriber station to perform an uplink transmission to the base station, wherein the uplink transmission is characterized by a reduced peak-to-average power ratio relative to a prior uplink transmission by the first subscriber station.

6. The method of claim 5, further comprising:
   resolving, by the first subscriber station, the resource allocation information; and caching, by the first subscriber station, the resource allocation information.

7. The method of claim 6, further comprising:
   performing, by the first subscriber station, the peak-to-average power ratio reduction based on current operating conditions, wherein current operating conditions comprise power amplifier back-off value, power amplifier attributes, and the current transmit power of the first subscriber station.

8. A method, comprising:
   receiving, by a subscriber station, resource allocation information from a base station, the subscriber station being one of a plurality of subscriber stations served by the base station in a wireless neighborhood, the resource allocation information comprising received signal strength levels from the plurality of subscriber stations in the wireless neighborhood, wherein each of the plurality of subscriber stations is assigned one or more reserved carriers;
   based on the resource allocation information, determining, by the subscriber station, which of the plurality of subscriber stations are transmitting strong signals to the base station;
   generating, by the subscriber station, an uplink signal to the base station, wherein the uplink signal comprises uplink data at a time-frequency orthogonal frequency division multiple access (OFDMA) symbol assigned to the subscriber station by the base station; and
   determining, by the subscriber station, whether to use one or more reserved carriers assigned to a different subscriber station to transmit to the base station.

9. The method of claim 8, further comprising:
   performing, by the subscriber station, peak-to-average power ratio reduction of an uplink transmission by the subscriber station, wherein the uplink transmission uses the carrier assigned to a different subscriber station to execute a tone reservation algorithm.

10. The method of claim 8 further comprising:
    not performing, by the subscriber station, peak-to-average power ratio reduction of an uplink transmission by the subscriber station.

11. The method of claim 8, further comprising:
caching, by the subscriber station, the resource allocation information.

12. The method of claim 9, performing, by the subscriber station, peak-to-average power ratio reduction of the subscriber station further comprising:
obtaining, by the subscriber station, the power amplifier back-off value, the power amplifier attributes, and the current transmit power of the subscriber station.

13. The method of claim 10, further comprising:
determining, by the subscriber station, that current operating conditions do not warrant reducing the peak-to-average power ratio; and
increasing, by the subscriber station, the transmit power of an uplink transmission from the subscriber station to the base station.

14. The method of claim 9, further comprising:
determining, by the subscriber station, that current operating conditions warrant reducing the peak-to-average power ratio; and
using, by the subscriber station, carriers assigned to another subscriber station, based on the resource allocation information, to reduce the peak-to-average power ratio of a subsequent uplink transmission to the base station.

15. The method of claim 9, further comprising:
selecting, by the subscriber station, a tone reservation algorithm; and
executing the selected tone reservation algorithm using the carriers assigned to another subscriber station, to uplink transmit to the base station, wherein the uplink transmission reduces the peak-to-average power ratio of the subscriber station.

* * * * *